United States Patent [19]
Davis et al.

[11] Patent Number: 5,930,017
[45] Date of Patent: Jul. 27, 1999

[54] METHOD AND SYSTEM FOR MAINTAINING AN OPTICAL PATH

[75] Inventors: Gary B. Davis, Rowlett; Reddy Urimindi; Andrew N. Robison, both of Plano, all of Tex.; Rainer R. Iraschko, Palo Alto, Calif.; George A. Georgiou, Garland; Glen Wellbrock, Wylie, both of Tex.

[73] Assignee: MCI Communications Corporation, Washington, D.C.

[21] Appl. No.: 08/990,960

[22] Filed: Dec. 15, 1997

[51] Int. Cl.⁶ .................................... H04J 14/02
[52] U.S. Cl. .................... 359/128; 359/110; 359/177
[58] Field of Search .................... 359/110, 124, 359/125, 117, 163, 128, 166, 154, 174, 176, 177

[56] References Cited

U.S. PATENT DOCUMENTS

| | | | |
|---|---|---|---|
| 5,493,432 | 2/1996 | Yoneda | 359/110 |
| 5,627,889 | 5/1997 | Eslambolchi | 379/221 |
| 5,663,820 | 9/1997 | Shiragaki | 359/128 |
| 5,739,935 | 4/1998 | Sabella | 359/128 |
| 5,790,294 | 8/1998 | Horiuchi et al. | 359/177 |

FOREIGN PATENT DOCUMENTS

| | | | |
|---|---|---|---|
| 0250619 | 10/1988 | Japan | 359/166 |
| 0135140 | 5/1989 | Japan | 359/166 |
| 2012949 | 1/1978 | United Kingdom | 359/166 |

OTHER PUBLICATIONS

Fee et-al, "EDFA Applications in the Terrestrial Network and Future Directions" MCI Telecommunications, pp. 289–297.

*Primary Examiner*—Rafael Bacares

[57] ABSTRACT

Optical loop-back is provided within an optical restoration system of an optical communication network. According to one embodiment, an optical restoration system includes first and second spare optical links (also called restoration paths) optically coupled in parallel between first and second optical cross-connect switches. Each restoration path includes a light regenerator and an optical amplifier. First and second optical cross-connect switches are each switched to provide respective optical loop-back paths between the first and second restoration paths or spare links. In one example, the optical loop-back paths can be configured within the optical cross-connect switches. In another example, the optical cross-connect switches are configured to couple optical signals between an external loop-back coupler and the first and second restoration paths or spare links. According to another embodiment, the first and second optical cross-connect switches are each switched to provide respective optical loop-back paths between different WDM channels in a bidirectional restoration path or spare link. In one example, the optical loop-back paths can be configured within the optical cross-connect switches. In another example, the optical cross-connect switches are configured to couple optical signals for different WDM channels between an external loop-back coupler and the bi-directional restoration path or spare link. Through loop-back connections, optical signals from light regenerators can travel along an idle restoration paths to squelch false alarms by light regenerators and to keep the optical amplifiers stabilized. Through loop-back connections, optical signals from light regenerators can also travel along a working path to squelch false alarms by light regenerators and to stabilize optical amplifiers in the working path prior to normalization.

13 Claims, 2 Drawing Sheets

METHOD AND SYSTEM FOR MAINTAINING AN OPTICAL PATH

BACKGROUND OF THE INVENTION

1. Field of the Invention

The present invention relates to optical communication, and in particular, to optical network restoration.

2. Related Art

A communication network serves to transport information among a number of locations. The information to be transported is often presented to the network in the form of time-domain electrical signals representing a combination of telephony, video, or computer data in a variety of formats. A typical communication network has many physical sites called nodes interconnected by information conduits called paths, also called spans. Each path or span carries data from one node to another node. A path or span can include one or more links. Each node can contain equipment for combining, separating, transforming, conditioning, and routing data.

Optical networks having optical fiber links are increasingly relied upon for carrying vital communications traffic at a high volume. Fiber optic cables carry far greater amounts of digital data than conventional electrical cables. A single fiber operating at approximately 10 Gigabits/sec (Gb/s) and transmitting data according to a high-speed synchronous digital hierarchy standard, such as the SONET OC-192 protocol, carries data equivalent to 129,024 voice calls and up to 16 OC-192 channels on a single fiber pair with wavelength division multiplexing. Moreover, dozens of fibers may be included in a single cable. The impact of a cable cut, or even a single optical fiber failure, can be widespread. Sudden link failure due to a fiber failure, cable cut, nodal failure, or any other system failure can cause a significant loss in revenue for a network owner or network subscriber. Sophisticated consumers no longer tolerate disruptions of service. Prompt restoration of optical signal impairment or loss is therefore essential to effective network management.

Optical networks can include endpoint nodes optically interconnected in one or more point-to-point links or through paths which include intermediate optical switching nodes. Optical switching nodes are also called optical cross-connect switches. Each path can include multiple intermediate nodes coupled to one another through multiple spans or links in a variety of topologies, such as, point-to-point, star, ring, mesh, spoke-hub, or any combination or variation thereof.

To maintain service integrity, optical restoration paths are provided in a physically separated route between optical switching nodes in the optical domain of an optical communication network. Working traffic traveling along a span between two optical switching nodes is switched to an optical restoration path in the event restoration is needed. For example, restoration may be triggered by a link failure, fiber degradation or cut, or any other massive equipment failure along a working path between the optical switching nodes. After a failure is repaired, traffic is switched from a restoration path back to a working path in a process known as "normalization."

Optical amplifiers and light regenerators are generally provided along working optical paths, such as long-haul fiber links, so that optical signals can be carried over greater distances. For the same reason it is desirable that optical restoration paths also include optical amplifiers and/or light regenerators. Optical restoration paths, however, are typically idle with no traffic signals present. Light regenerators placed in an optical restoration path would issue false alarms during idle periods when restoration is not needed and light is not received from line terminating equipment. Delay would be experienced if optical amplifiers are placed in an optical restoration path as the amplified output of one or more optical amplifiers would have to ramp up to an operating condition when traffic is switched to the restoration path. The output of a single optical amplifier can take 10 to 30 milliseconds to ramp-up after an input signal is received. The overall ramp-up delay effect is even greater for a series of line optical amplifiers. Delay is also experienced in the normalization of optical amplifiers in a working path as the optical amplifiers may not have received any input light signals during a restoration event.

What is needed is a method and system that squelches false alarms by components in an optical restoration path which are sensitive to loss of light such as light regenerators. Further, a method and system is needed that stabilizes components such as optical amplifiers in an optical restoration path even when the optical restoration path is idle. Similarly, a method and system is needed that squelches false alarms and stabilizes components in an optical working path prior to normalization.

SUMMARY OF THE INVENTION

The present invention provides loop-back within an optical restoration system of an optical communication network. According to one embodiment of the present invention, an optical restoration system includes first and second spare restoration paths optically coupled in parallel between first and second optical cross-connect switches. The first and second restoration paths are two halves of a single bi-directional optional restoration path. The first restoration path includes a first light regenerator and a first optical amplifier optically coupled along a first optical spare link. An optical signal output from the first light regenerator travels in a first direction toward the second optical cross-connect switch. The second restoration path includes a second light regenerator and a second optical amplifier optically coupled along a second spare link. An optical signal output from the second light regenerator travels in a second direction toward the first optical cross-connect switch.

According to the present invention, the first and second optical cross-connect switches are each switched to provide respective optical loop-back paths between the first and second restoration paths or spare links. In one example, the optical loop-back paths can be configured within the optical cross-connect switches. In another example, the optical cross-connect switches are configured to couple optical signals between an external loop-back coupler and the first and second restoration paths or spare links.

Thus, according to the present invention, optical signals from the first and second light regenerators travel along both the first and second restoration paths (even when the first and second restoration paths are idle) to squelch false alarms by the first and second light regenerators and to keep the first and second optical amplifiers stabilized.

According to an optical restoration system includes first and second spare optical links (also called restoration paths) optically coupled in parallel between first and second optical cross-connect switches. The first restoration path includes a first light regenerator and a first optical amplifier optically coupled along a first optical spare link. An optical signal output from the first light regenerator travels in a first direction toward the second optical cross-connect switch. The second restoration path includes a second light regenerator and a second optical amplifier optically coupled along a second spare link. An optical signal output from the second light regenerator travels in a second direction toward the first optical cross-connect switch.

According to the present invention, the first and second optical cross-connect switches are each switched to provide respective optical loop-back paths between different WDM channels in a bi-directional restoration path or spare link. In one example, the optical loop-back paths can be configured within the optical cross-connect switches. In another example, the optical cross-connect switches are configured to couple optical signals between an external loop-back coupler and the first and second restoration paths or spare links.

The bi-directional restoration path is optically coupled between first and second optical cross-connect switches and includes a bi-directional light regenerator and a bi-directional optical amplifier. Optical signals output from the bi-directional light regenerator travel in first and second directions in respective first and second wavelength division multiplex channels between the first and second optical cross-connect switches.

According to the present invention, the first and second optical cross-connect switches are each switched to provide respective optical loop-back paths between different WDM channels carrying traffic in opposite directions over the bi-directional restoration path or spare link. In one example, the optical loop-back paths can be configured within the optical cross-connect switches. In another example, the optical cross-connect switches are configured to couple optical signals for different WDM channels between an external loop-back coupler and the bi-directional restoration path or spare link.

Thus, according to the present invention, optical signals from the first and second light regenerators travel along different WDM channels in opposite directions in the bi-directional restoration path or link (even when the bi-directional restoration path is idle) to squelch false alarms by light regenerators and to keep optical amplifiers stabilized.

According to a further embodiment of the present invention, loop-back connections can also be formed at optical cross-connect switching nodes between a working link or channel (e.g., a WDM or non-WDM channel) and a restoration link or channel to squelch false alarms by light regenerators and to keep optical amplifiers stabilized in the working path prior to normalization.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention is described in an example environment of an optical restoration system for an optical communication network. The term "optical communication network" is used herein to refer to any type of optical communication network having any type of topology including but not limited to, one or more point-to-point links, star, spoke-hub, tandem, ring, mesh, and any combination or variation of these topologies. The term "optical restoration system" refers to any spare optical restoration path (uni-directional or bi-directional) having one or more optical spare links that provides spare capacity for an optical communication network. Each optical spare link can carry uni-directional or bi-directional traffic in wavelength division multiplexed (WDM) or non-wavelength divisional multiplexed channels.

Description in these terms is provided for convenience only. It is not intended that the invention be limited to application in this example environment. In fact, after reading the following description, it will become apparent to a person skilled in the relevant art how to implement the invention in alternative environments.

Figure 1:
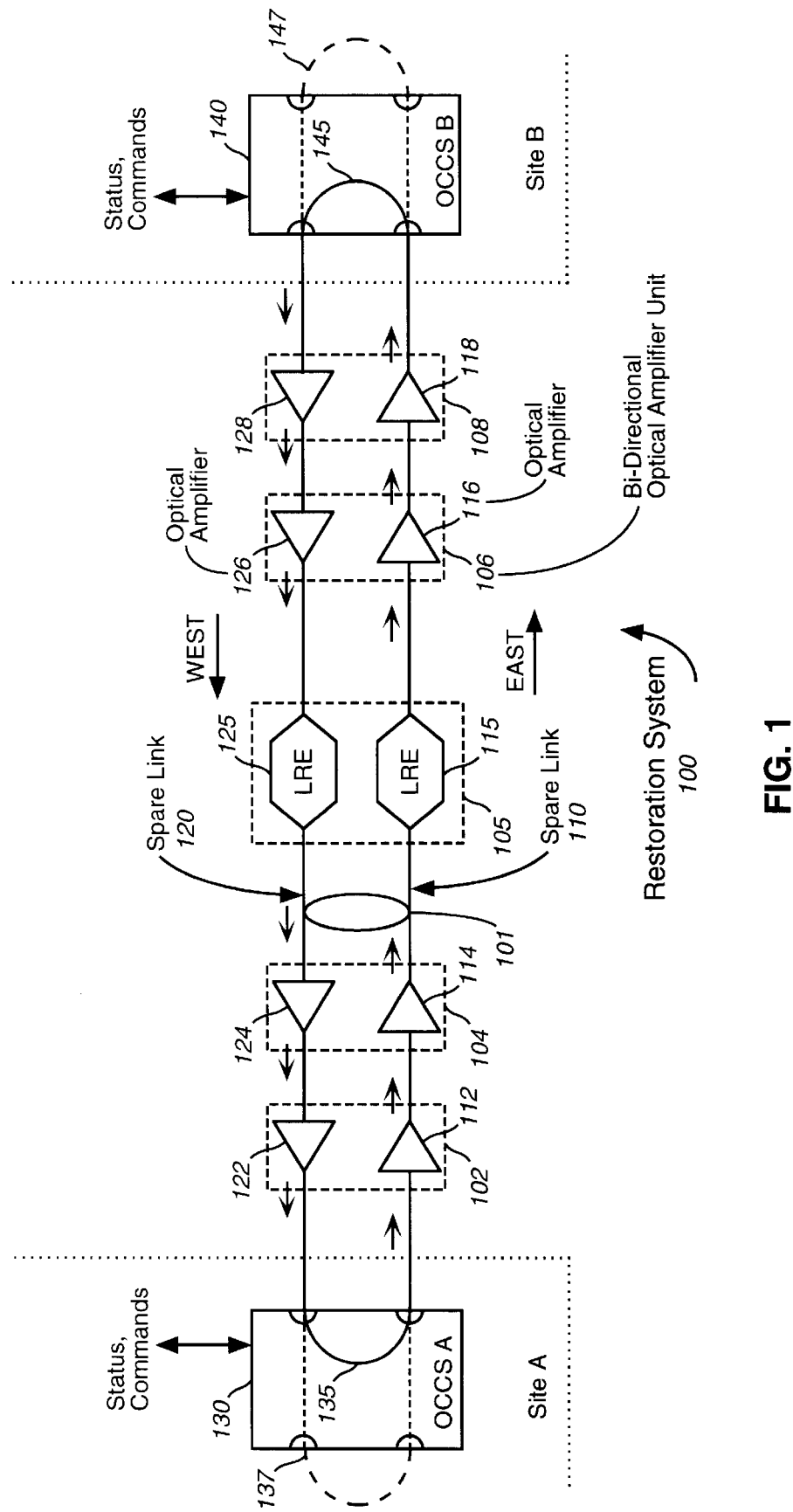
FIG. 1 is a diagram of an optical restoration system using loop-back according to one embodiment of the present invention.

FIG. 1 is a diagram of an optical restoration system 100 using loop-back according to one embodiment of the present invention. Optical restoration system 100 includes a bi-directional restoration path 101 having two spare optical links 110 and 120 optically coupled in parallel between optical cross-connect switches 130 and 140. Optical restoration system 100 provides a bi-directional optical restoration path 101 for working traffic traveling in either direction between two sites or nodes A, B. In one example, optical link 110 is reserved as a spare link for carrying east-bound traffic from Site A to Site B. Optical link 120 is reserved as a spare link for carrying west-bound traffic from Site B to Site A.

The bi-directional optical restoration path 101 includes bi-directional optical amplifier units 102, 104, 106, and 108 and a bi-directional light regenerator unit 105. For clarity, the operation of the bi-directional restoration path 101 will be described with reference to the two halves of bi-directional transmission, that is, east-bound optical spare link 110 and west-bound optical spare link 120. Optical spare link 110 includes four optical amplifiers 112, 114, 116 and 118, and a light regenerator 115. Optical spare link 120 includes four optical amplifiers 122, 124, 126 and 128, and a light regenerator 125. This example is illustrative only as any number of optical amplifiers and light regenerators can be used as needed to carry traffic the entire length of the optical spare links 110, 120.

During normal operation, working traffic is carried between site A and site B along one or more working links (not shown). Only in the event restoration or other servicing is needed, working traffic is switched to travel from each optical cross-connect switch 130, 140 to one of the optical spare links 110, 120. Thus, optical restoration system 100 is typically idle during normal operation, in the sense that working traffic is not being carried.

The present invention takes advantage of the well-known properties of light regenerators, namely, that light regenerators output an optical signal regardless of whether an optical signal input to the light regenerator is present. In particular, an optical loop-back connection is provided at each site A and B to loop-back all or a portion of an optical signal traveling from one spare link to the other spare link. For example, OCCS 130 is switched to form an optical loop-back path 135 that loops back traffic within OCCS 130 itself. In this way, even when the restoration path is idle, an optical signal output from LRE 125 and amplified by optical amplifiers 122, 124 during travel along optical spare link 120 loops backs along optical loop-back path 135 within OCCS 130 for output along optical spare link 110. Alternatively, OCCS 130 can be switched to optically couple both optical spare links 110 and 120 to an external loop-back coupler 137.

Likewise, at side B, OCCS 140 can be switched to form an optical loop-back path 145 that loops back traffic within OCCS 140 itself. In this way, even when the restoration path is idle, an optical signal output from LRE 115 and amplified by optical amplifiers 116, 118 during travel along optical spare link 110 loops backs along optical loop-back path 145 within OCCS 140 for output along optical spare link 120. Alternatively, OCCS 140 can be switched to optically couple both optical spare links 110 and 120 to an external loop-back coupler 147. As would be apparent to a person skilled in the art given this description, external loop-back couplers 137, 147 can be made up of any known optical coupling component such as an optical fiber, integrated optical waveguide, and/or coupler(s).

By loop-backing the optical signals output from LREs 115, 125 along the optical spare links 110, 120, the present invention squelches false alarms which would otherwise be generated by LREs 115, 125 and any other loss of signal alarm generators when the restoration system 100 is idle. By loop-backing the optical signals output from LREs 115, 125 along the optical spare links 110, 120, the present invention further maintains optical amplifiers 112, 114, 116, and 118 along optical spare link 110 and optical amplifiers 122, 124, 126, and 128 along optical spare link 120 in a stabilized state ready for operation without turn-on delay in the event working traffic is routed through restoration system 100. In this way, the present invention also solves the problem of the slow ramp-up time and turn-on delay which is typical of optical amplifiers, such as, fiber amplifiers. When a restoration route is switched over to carry traffic, the output of the optical amps decays slowly with respect to the OCCS switching duration, thereby ensuring that little or no ramp up time by the optical amplifiers is encountered.

Figure 2:
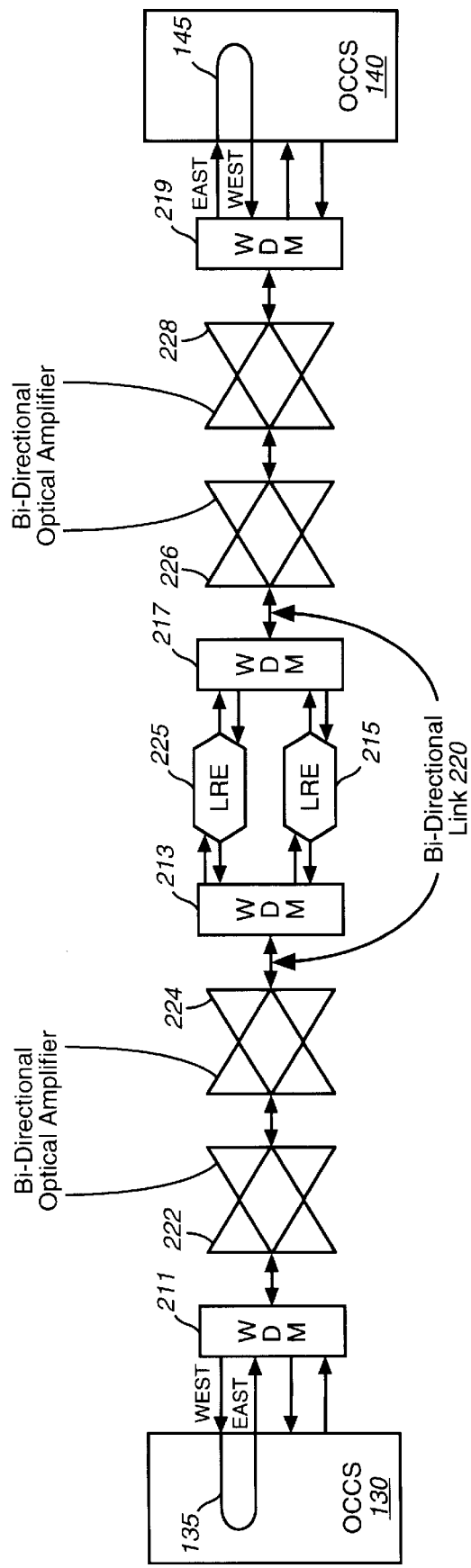
FIG. 2 is a diagram of an optical restoration system with WDM using loop-back according to another embodiment of the present invention.

FIG. 2 is a diagram of an optical restoration system 200 with wavelength division multiplexing (WDM) using loop-back according to another embodiment of the present invention. Optical restoration system 200 includes a bi-directional WDM optical link 220 optically coupled between optical cross-connect switches 130 and 140.

Thus, optical restoration system 200 provides an optical restoration path for working traffic traveling in either direction between two sites or nodes A, B. In one example, four WDM channels are supported for carrying optical signals in both directions between sites A and B. Two WDM channels can carry east-bound traffic and two WDM channels can carry west-bound traffic as shown in FIG. 2. For example, in an erbium-band operating window, the two east-bound WDM channels can carry data in two respective carrier wavelengths of approximately 1533 (nanometer) nm. and 1549 nm.; and the two west-bound WDM channels can carry data in two respective carrier wavelengths of approximately 1541 nm. and 1557 nm. Of course the present invention is not intended to be limited to this example, as any WDM operating window including any number of WDM channels at different wavelengths can be used, as would be apparent to a person skilled in the art given this description.

Bi-directional WDM optical spare link 220 includes four WDM units 211, 213, 217, and 219; and four bi-directional optical amplifiers 222, 224, 226 and 228. A bi-directional light regenerator unit consists of two uni-directional light regenerators 215, 225 provided between WDM units 213 and 217. This example is illustrative only as any number of WDM units, optical amplifiers and light regenerators can be used as needed to carry traffic the entire length of the bi-directional WDM optical spare links 220.

During normal operation, working traffic is carried between site A and site B along one or more working links (not shown). In the event restoration or other servicing is needed, working traffic is switched to travel from each optical cross-connect switch 130, 140 to a WDM channel in the optical spare link 220. Thus, optical restoration system 200 is typically idle, in the sense that working traffic is not being carried.

As described with respect to the embodiment of FIG. 1, the present invention takes advantage of the well-known properties of light regenerators, namely, that light regenerators output an optical signal regardless of whether an optical signal input to the light regenerator is present. In particular, an optical loop-back connection is provided at each site A and B to loop-back all or a portion of an optical signal traveling in a WDM channel in one direction along the spare link 220 to another WDM channel traveling in the opposite direction along the spare link 220.

For example, in FIG. 2, OCCS 130 is switched to form an optical loop-back path 135 that loops back traffic within OCCS 130 itself. In this way, even when the restoration path is idle, an optical signal in one west WDM channel output from LRE 215 and amplified by optical amplifiers 222, 224 during travel loops backs along optical loop-back path 135 within OCCS 130 for output in a east WDM channel. Alternatively, OCCS 130 can be switched to optically couple two WDM channels to an external loop-back coupler (not shown), as described earlier with respect to FIG. 1.

Likewise, at side B, OCCS 140 can be switched to form an optical loop-back path 145 that loops back traffic within OCCS 140 itself. In this way, even when the restoration path is idle, an optical signal in one east WDM channel output from LRE 225 and amplified by optical amplifiers 226, 228 during travel loops backs along optical loop-back path 145 within OCCS 140 for output in a west WDM channel. Alternatively, OCCS 140 can be switched to optically couple two WDM channels to an external loop-back coupler (not shown), as described earlier with respect to FIG. 1.

By loop-backing the optical signals output from LREs 215, 225 in WDM channels along the optical spare link 220, the present invention squelches false alarms which would otherwise be generated by LREs 215, 225 and any other loss of signal alarm generators when the restoration system 200 is idle. By loop-backing the optical signals output from LREs 215, 225 along the optical spare link 220, the present invention further maintains optical amplifiers 222, 224, 226, and 228 in a stabilized state ready for operation without turn-on delay in the event working traffic is routed through restoration system 200. In this way, the present invention also solves the problem of the slow ramp-up time and turn-on delay of optical amplifiers in a WDM environment, such as, erbium fiber amplifiers. The present invention maintains a signal through the optical amplifiers so that turn-on delay is avoided when a traffic bearing signal is switched onto a spare optical link.

According to a further embodiment of the present invention, loop-back connections, as described above, can also be formed at optical cross-connect switching nodes 130, 140 between a working link or channel (WDM and/or non-WDM) and a restoration link or channel to squelch false alarms by light regenerators and to keep optical amplifiers stabilized in the working path prior to normalization.

In general, the present invention can be used with any type of optical cross-connect switch, optical cross-connect switch controller, optical fiber, optical amplifier, light regenerator, and WDM unit. OCCSs 130 and 140 can be any type of multi-port (N×M) optical cross-connect switch, where N and M are any whole numbers. For example, a N X N OCCS can be used having a number of ports, e.g. N=1,2,4, 8, 16, 40, 72, 128, or 256. Any type of optical switch can be used depending upon the available technology. See, e.g., the integrated lithium niobate directional-coupler type switches discussed by Waynant, R. et al., Eds., *Electro-Optics Handbook*, McGraw-Hill, Inc. U.S.A. (1994), chapter 26, and especially page 26.34 (incorporated herein by reference). Other types of suitable optical switching technology include switches based on a thermo-optic effect in polymer waveguides or silica glass, semiconductor amplification, piezo movement, and integrated indium phosphide. In addition, while a single OCCS 130 or 140 is shown schematically for clarity, multiple discrete switches and couplers can be used to perform equivalent multiple-port optical switching. For example, a set of discrete 1×2 or 2×2 optical switches can used to switch individual signals between fibers and/or WDM channels in different paths. Y-couplers and directional couplers can also be used.

Optical cross-connect switch (OCCS) controllers (not shown) or a user through a user-interface can send commands to switch OCCS 130 and OCCS 140 to the loop-back configuration described with respect to FIGS. 1 and 2. Such OCCS controllers or user-interface can be provided in the OCCSs 130 and 140 themselves, as separate controller units, or as part of a separate centralized network manager. OCCS controllers can be implemented as would be apparent to a person skilled in the art, any type of switch command and protocol can be used to configure a loop-back configuration as described herein.

Finally, optical amplifiers, light regenerators (also called repeaters), and WDM units are well-known components in long-distance fiber links and optical networks and need not be described in further detail. See, e.g., Freeman, R., *Telecommunication Systems Engineering*, 3rd. Ed. (John Wiley & Sons.: New York 1996), Chapter 7, section 6, "The Design of Long-Distance Links: Fiber Optics Communication Links," pp. 317–338 (incorporated herein by reference) and Minoli, D., *Telecommunications Technology Handbook*, (Artech House: Norwood, Mass.: 1991), Chapter 7, "Fiber Optic Technology and Transmission Components," pp. 341–398 (incorporated herein by reference).

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. An optical restoration system for an optical communication network comprising:

a first optical cross-connect switch;

a second optical cross-connect switch; and a bi-directional optical restoration path having a first restoration path and a second restoration path, said first restoration path is optically coupled between said first and second optical cross-connect switches, said first restoration path including a first light regenerator and a first optical amplifier optically coupled along said first restoration path, wherein an optical signal output from said first light regenerator travels in a first direction from said first optical cross-connect switch to said second optical cross-connect switch, and said second restoration path is optically coupled between said first and second optical cross-connect switches, said second restoration path including a second light regenerator and a second optical amplifier optically coupled along said second restoration path, wherein an optical signal output from said second light regenerator travels in a second direction from said second optical cross-connect switch to said first optical cross-connect switch;

wherein said first and second optical cross-connect switches are each switched to provide respective optical loop-back connections between said first and second restoration paths; whereby, optical signals from the first and second light regenerators travel along both the first and second restoration paths when the first and second restoration paths are idle to squelch false alarms by the first and second light regenerators and to keep the first and second optical amplifiers stabilized.

2. The optical restoration system of claim 1, wherein said first optical cross-connect switch includes first and second ports optically coupled respectively to said first and second restoration paths and said second optical cross-connect switch includes first and second ports optically coupled respectively to said first and second restoration paths; whereby the loop-back connections are formed within each first and second cross-connect switch between the first and second ports.

3. The optical restoration system of claim 1, further comprising first and second loop-back couplers;

wherein said first optical cross-connect switch includes first, second, third and fourth ports, said first port and said second port of said first optical cross-connect switch are optically coupled respectively to said first and second restoration paths, and said first loop-back coupler is optically coupled between said third and fourth ports of the first optical cross connect switch;

wherein said second optical cross-connect switch includes first, second, third and fourth ports, said first port and said second port of said second optical cross-connect switch are optically coupled respectively to said first and second restoration paths, and said second loop-back coupler is optically coupled between said third and fourth ports of the second optical cross connect switch.

4. An optical restoration system for an optical communication network comprising:

a first optical cross-connect switch;

a second optical cross-connect switch;

a bi-directional restoration path optically coupled between said first and second optical cross-connect switches, said bi-directional restoration path including a bi-directional light regenerator and a bi-directional optical amplifier optically coupled along said bi-directional restoration path, wherein optical signals output from said bi-directional light regenerator travel in first and second directions in respective first and second wavelength division multiplex channels between said first optical cross-connect switch and said second optical cross-connect switch;

wherein said first and second optical cross-connect switches are each switched to provide respective optical loop-back connections for the optical signals traveling in first and second directions in respective first and second wavelength division multiplex channels between said first optical cross-connect switch and said second optical cross-connect switch; whereby, optical signals from the bi-directional regenerator travel along the bi-directional restoration path when the bi-directional restoration path is idle to squelch false alarms by the bi-directional regenerator and to keep the bi-directional optical amplifier stabilized.

5. The optical restoration system of claim 4, further comprising a first WDM unit having first and second ports, the first WDM port carrying a first WDM channel in a first direction and the second WDM port carrying a second WDM channel in a second direction; wherein said first optical cross-connect switch includes first and second ports optically coupled respectively to said first and second WDM ports in said first WDM unit.

6. The optical restoration system of claim 4, wherein said bi-directional light regenerator comprises two light regenerators for regenerating optical signals traveling in two opposite directions.

7. The optical restoration system of claim 4, wherein said bi-directional optical amplifier comprises two optical amplifiers for amplifying optical signals traveling in two opposite directions.

8. The optical restoration system of claim 4, further comprising:
a first WDM unit having first and second ports, the first WDM port carrying a first WDM channel in a first direction and the second WDM port carrying a second WDM channel in a second direction;
wherein said first optical cross-connect switch includes first and second ports optically coupled respectively to said first and second WDM ports in said first WDM unit such that a first loop-back connection is formed within the first cross-connect switch between the first and second ports.

9. The optical restoration system of claim 4, further comprising:
a first WDM unit having first and second ports, the first WDM port carrying a first WDM channel in a first direction and the second WDM port carrying a second WDM channel in a second direction; and
a first loop-back coupler;
wherein said first optical cross-connect switch includes first, second, third and fourth ports, said first port and said second port of said first optical cross-connect switch are optically coupled respectively to said first and second WDM ports in said first WDM unit, and said first loop-back coupler optically couples said third and fourth ports of the first optical cross connect switch.

10. The optical restoration system of claim 8, further comprising:
a second WDM unit having first and second ports, the first WDM port of the second WDM unit carrying a first WDM channel in a first direction and the second WDM port of the second WDM unit carrying a second WDM channel in a second direction;
wherein said second optical cross-connect switch includes first and second ports optically coupled respectively to said first and second WDM ports in said second WDM unit; whereby a second loop-back connection is formed within the second cross-connect switch between the first and second ports.

11. The optical restoration system of claim 9, further comprising:
a second WDM unit having first and second ports, the first WDM port of the second WDM unit carrying a first WDM channel in a first direction and the second WDM port of the second WDM unit carrying a second WDM channel in a second direction;
wherein said second optical cross-connect switch includes first, second, third and fourth ports, said first port and said second port of said second optical cross-connect switch are optically coupled respectively to said first and second restoration paths, and said second loop-back coupler optically couples said third and fourth ports of the second optical cross connect switch.

12. An optical restoration system for an optical communication network comprising:
a first optical cross-connect switch;
a second optical cross-connect switch;
a first restoration path optically coupled between said first and second optical cross-connect switches, said first restoration path including a first light regenerator and a first optical amplifier optically coupled along said first restoration path, wherein an optical signal output from said first light regenerator travels in a first direction toward said second optical cross-connect switch; and
a first working path optically coupled between said first and second optical cross-connect switches, said first working path including a second light regenerator and a second optical amplifier optically coupled along said first working path, wherein an optical signal output from said second light regenerator travels in a second direction toward said first optical cross-connect switch;
wherein said first and second optical cross-connect switches are each switched to provide respective optical loop-back connections between said first restoration path and said first working path; whereby, optical signals from the first and second light regenerators travel along said first restoration path and said first working path when the first working path is idle prior to normalization to squelch false alarms by the first and second light regenerators and to keep the first and second optical amplifiers stabilized.

13. A method for maintaining an optical restoration system, the optical restoration system having first and second restoration paths optically coupled between first and second optical cross-connect switches, the first and second restoration paths each having a light regenerator and an optical amplifier; the method comprising the steps of:
switching the first optical cross-connect switch to form a first loop-back connection between the first and second restoration paths; and
switching the second optical cross-connect switch to form a second loop-back connection between the first and second restoration paths; whereby, optical signals from the light regenerators travel along both the first and second restoration paths when the first and second restoration paths are idle to squelch false alarms and to keep each optical amplifier stabilized.

* * * * *